(12) United States Patent
Murao et al.

(10) Patent No.: US 8,477,263 B2
(45) Date of Patent: Jul. 2, 2013

(54) LIQUID CRYSTAL DISPLAY DEVICE

(75) Inventors: Takehiro Murao, Osaka (JP); Naru Usukura, Osaka (JP); Seishi Kosegawa, Osaka (JP); Tadashi Nemoto, Osaka (JP); Toshiyuki Yoshimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 154 days.

(21) Appl. No.: 12/993,303

(22) PCT Filed: Mar. 30, 2009

(86) PCT No.: PCT/JP2009/001446
§ 371 (c)(1),
(2), (4) Date: Nov. 18, 2010

(87) PCT Pub. No.: WO2009/141953
PCT Pub. Date: Nov. 26, 2009

(65) Prior Publication Data
US 2011/0069253 A1    Mar. 24, 2011

(30) Foreign Application Priority Data

May 20, 2008 (JP) ................. 2008-132239

(51) Int. Cl.
*G02F 1/13357* (2006.01)
*F21V 7/04* (2006.01)

(52) U.S. Cl.
USPC ............... 349/65; 349/95; 362/606; 362/620

(58) Field of Classification Search
USPC ............... 349/62, 65, 95; 362/606, 607, 612, 362/620, 626; 359/619
See application file for complete search history.

(56) References Cited

U.S. PATENT DOCUMENTS

| 5,745,199 | A | 4/1998 | Suzuki et al. |
| 6,231,200 | B1 | 5/2001 | Shinohara et al. |
| 6,502,947 | B2 * | 1/2003 | Matsumoto et al. .......... 362/626 |
| 2002/0044233 | A1 * | 4/2002 | Ohkawa .......................... 349/65 |
| 2003/0214615 | A1 | 11/2003 | Colgan et al. |
| 2005/0063068 | A1 * | 3/2005 | Sakurai et al. ................ 359/626 |

(Continued)

FOREIGN PATENT DOCUMENTS

| JP | 06-250024 | 9/1994 |
| JP | 2000-329906 | 11/2000 |

(Continued)

OTHER PUBLICATIONS

English translation of the International Preliminary Report on Patentability mailed Jan. 20, 2011 in corresponding PCT Application No. PCT/JP2009/001446.

(Continued)

*Primary Examiner* — Dung Nguyen
*Assistant Examiner* — Tai Duong
(74) *Attorney, Agent, or Firm* — Nixon & Vanderhye P.C.

(57) ABSTRACT

A liquid crystal display device including a plurality of pixels arranged in a matrix along a first direction and a second direction which are perpendicular to each other a TFT substrate, a counter substrate, a liquid crystal layer, a plurality of microlenses, and a backlight provided on a side of the plurality of microlenses which is opposite to the TFT substrate. The plurality of microlenses includes a plurality of lenticular lenses extending in the first direction, the plurality of lenticular lenses being arranged side by side along the second direction.

4 Claims, 5 Drawing Sheets

U.S. PATENT DOCUMENTS

| | | | |
|---|---|---|---|
| 2007/0070649 A1* | 3/2007 | Won et al. | 362/620 |
| 2007/0097293 A1 | 5/2007 | Nakanishi et al. | |
| 2007/0171493 A1* | 7/2007 | Nakanishi | 359/15 |
| 2007/0182890 A1* | 8/2007 | Mizusako | 349/110 |
| 2009/0066880 A1* | 3/2009 | Sugita et al. | 349/64 |
| 2010/0182534 A1* | 7/2010 | Usukura et al. | 349/62 |

FOREIGN PATENT DOCUMENTS

| | | |
|---|---|---|
| JP | 2005-195733 | 7/2005 |
| JP | 2005-208553 | 8/2005 |
| JP | 2007-133037 | 5/2007 |

OTHER PUBLICATIONS

International Search Report for PCT/JP2009/001446, mailed Apr. 28, 2009.

* cited by examiner

LIQUID CRYSTAL DISPLAY DEVICE

This application is the U.S. national phase of International Application No. PCT/JP2009/001446, filed 30 Mar. 2009, which designated the U.S. and claims priority to Japanese Application No. 2008-132239, filed 20 May 2008, the entire contents of each of which are hereby incorporated by reference.

TECHNICAL FIELD

The present invention relates to a liquid crystal display device which includes a microlens array and a backlight which is for use in liquid crystal display devices and the like.

BACKGROUND ART

In recent years, liquid crystal display devices are widely used as display devices for monitors, projectors, mobile information terminals, mobile phones, and the like. Generally speaking, a liquid crystal display device allows the transmittance (or reflectance) of a liquid crystal display panel to vary with a driving signal, thus modulating the intensity of light from a light source for irradiating the liquid crystal display panel, whereby images and text characters are displayed. Liquid crystal display devices include direct-viewing type display devices in which images or the like that are displayed on the liquid crystal display panel are directly viewed, projection-type display devices (projectors) in which images and the like that are displayed on a display panel are projected onto a screen through a projection lens in an enlarged size, and so on.

By applying a driving voltage which corresponds to an image signal to each of the pixels that are in a regular matrix arrangement, a liquid crystal display device causes a change in the optical characteristics of a liquid crystal layer in each pixel, and regulates the transmitted light in accordance with the optical characteristics of the liquid crystal layer with polarizers (which typically are polarizing plates) being disposed at the front and rear thereof, thereby displaying images, text characters, and the like. In the case of a direct-viewing type liquid crystal display device, usually, these polarizing plates are directly attached to a light-entering substrate (the rear substrate) and a light-outgoing substrate (the front substrate or viewer-side substrate) of the liquid crystal display panel.

Methods for applying an independent driving voltage for each pixel include a passive matrix type and an active matrix type. Among these, on a liquid crystal display panel of the active matrix type, switching elements and wiring lines for supplying driving voltages to the pixel electrodes need to be provided. As switching elements, non-linear 2-terminal devices such as MIM (metal-insulator-metal) devices and 3-terminal devices such as TFT (thin film transistor) devices are in use.

On the other hand, in a liquid crystal display device of the active matrix type, when strong light enters a switching element (in particular a TFT) which is provided on the display panel, its element resistance in an OFF state is decreased, thereby allowing the electric charge which was charged to the pixel capacitor under an applied voltage to be discharged, such that a predetermined displaying state cannot be obtained. Thus, there is a problem of light leakage even in a black state, thus resulting in a decreased contrast ratio.

Therefore, in a liquid crystal display panel of the active matrix type, in order to prevent light from entering the TFTs (in particular channel regions), a light shielding layer (called "black matrix") is provided on a TFT substrate on which the TFTs and the pixel electrodes are provided, or on a counter substrate that opposes the TFT substrate via the liquid crystal layer, for example.

Now, in the case where the liquid crystal display device is a reflection-type liquid crystal display device, decrease in the effective pixel area can be prevented by utilizing reflection electrodes as a light shielding layer. However, in a liquid crystal display device which performs displaying by utilizing transmitted light, providing a light shielding layer in addition to the TFTs, gate bus lines, and source bus lines, which do not transmit light, will allow the effective pixel area to be decreased, thus resulting in a decrease in the ratio of the effective pixel area to the total area of the displaying region, i.e., the aperture ratio.

Liquid crystal display devices are characterized by their light weight, thinness, and low power consumption, and therefore are widely used as display devices of mobile devices such as mobile phones and mobile information terminals. With a view to increasing the amount of displayed information, improving the image quality, and so on, there are stronger and stronger desires for display devices to have higher resolutions. Conventionally, it has been a standard to adopt QVGA displaying by 240×320 pixels for liquid crystal display devices of the 2 to 3-inch class, for example, but devices which perform VGA displaying by 480×640 pixels have also been produced in the recent years.

As liquid crystal display panels become higher in resolution and smaller in size, the aforementioned decrease in their aperture ratio presents a greater problem. The reason is that, even if there is a desire to reduce the pixel pitch, constraints such as electrical performance and fabrication techniques make it impossible for the TFTs, the bus lines, etc., to become smaller than certain sizes. It might be possible to enhance the brightness of the backlight in order to compensate for the decreased transmittance, but this will induce an increased power consumption, thus presenting a particular problem to mobile devices.

In recent years, as display devices of mobile devices, transflective-type liquid crystal display devices have become prevalent, which perform displaying under dark lighting by utilizing light from a backlight, and which perform displaying under bright lighting by reflecting light entering the display surface of the liquid crystal display panel. In a transflective-type liquid crystal display device, a region (reflection region) which performs displaying in the reflection mode and a region (transmission region) which performs displaying in the transmission mode are included in each pixel. Therefore, reducing the pixel pitch significantly will lower the ratio of the area of the transmission region to the total area of the displaying region (aperture ratio of the transmission region). Thus, although transflective-type liquid crystal display devices have the advantage of realizing displaying with a high contrast ratio irrespective of the ambient brightness, they have a problem in that their brightness is lowered as the aperture ratio of the transmission region becomes smaller.

As a method for improving the efficiency of light utility of such a liquid crystal display device including transmission regions, Patent Document 1, Patent Document 2, Patent Document 3, and Patent Document 4 disclose providing a microlens array for converging light in each pixel on the liquid crystal display panel in order to improve the effective aperture ratio of the liquid crystal display panel. The applicant of the present application disclosed, in Patent Document 5, a method of fabricating a liquid crystal display panel with a microlens array which is suitably used in, for example, a transmission-type or transflective-type liquid crystal display device. According to the fabrication method described in Patent Document 5, microlenses can be formed in a self-aligning manner with a high positional precision relative to the pixels.

Patent Document 1: Japanese Laid-Open Patent Publication No. 2000-329906
Patent Document 2: Japanese Laid-Open Patent Publication No. 2005-195733
Patent Document 3: Japanese Laid-Open Patent Publication No. 2005-208553
Patent Document 4: Japanese Laid-Open Patent Publication No. 8-201796
Patent Document 5: Japanese Laid-Open Patent Publication No. 2005-196139

DISCLOSURE OF INVENTION

Problems to be Solved by the Invention

FIG. 11 is a cross-sectional view showing an example of a liquid crystal display device which includes a microlens array and a backlight.

The liquid crystal display device 100' shown in FIG. 11 is an active matrix type transflective liquid crystal display (LCD). As shown in the drawing, the liquid crystal display device 100' includes a liquid crystal display panel (a liquid crystal display panel with microlenses) 50' and a backlight 30' placed under the liquid crystal display panel 50' (on the surface opposite to the display surface).

The liquid crystal display panel 50' includes a laminate substrate 51 including a plurality of pixels which are in a matrix arrangement, a microlens array 52' including a plurality of microlenses 53' provided over a light receiving surface of the laminate substrate 51 (the bottom surface of the laminate substrate 51 which extends parallel to the sheet of the drawing), a support 59 provided in a perimeter region of the microlens array 52', a front-face side optical film 54 provided on the viewer side of the laminate substrate 51 (upper side of the drawing), a rear-face side optical film 55 which is provided on the light-incident side of the microlens array 52', and a protection layer 56' interposed between the rear-face side optical film 55 and the microlens array 52'.

The front-face side optical film 54 is bonded to the laminate substrate 51 via an adhesion layer 57. The rear-face side optical film 55 is bonded to the protection layer 56' via an adhesion layer 58. The front-face side optical film 54 and the rear-face side optical film 55 each include a polarization film which transmits linearly-polarized light.

The laminate substrate 51 includes a TFT substrate 60 which has TFTs in respective pixels, a counter substrate 62 which is a color filter substrate (CF substrate), and a liquid crystal layer 64. The liquid crystal layer 64 includes a liquid crystal material encapsulated between the TFT substrate 60 and the counter substrate 62 and is tightly sealed by a sealant 66 provided at the perimeter.

Each of the microlenses 53' is a lenticular lens extending in the column direction of the pixels arranged in a matrix over the laminate substrate 51 (a direction perpendicular to the sheet of the drawing: x-direction). The microlens array 52' is constituted of a plurality of such microlens 53' which are arranged side by side along the row direction of the pixels (a horizontal direction over the sheet of the drawing: y-direction).

The backlight 30' is an edge light type backlight which uses a turning lens (TL) or a reversed prism (RP). With the backlight 30' of this type, collimated light whose directivity is high when viewed along the y-direction (also referred to as "light of narrow directivity") can be obtained.

The backlight 30' includes a light guide plate 32', a light source 34 such as an LED, cathode ray tube, or the like, which is placed over one side surface of the light guide plate 32', a reflector 36 placed under the light guide plate 32', and a prism sheet 38' placed over the light guide plate 32' (on the liquid crystal panel side). The prism sheet 38' has a plurality of prisms which are downwardly tapered.

The lower part of the light guide plate 32', which faces to the reflector 36, has saw-tooth grooves. As a result, the bottom surface of the light guide plate 32' has a plurality of slope surfaces which have different slope angles. Here, the plurality of slope surfaces are shaped such that a slope surface which is more distant from the light source 34 has a greater slope angle.

Light emitted from the light source 34 is reflected by the reflector 36 or the slope surfaces of the light guide plate 32' and thereafter transmitted through the upper surface (emission surface) of the light guide plate 32'. Then, it is refracted by the prisms of the prism sheet 38' to outgo toward the liquid crystal display panel 50'.

Part of the light emitted from the light source 34 which is incident on the bottom surface and the upper surface of the light guide plate 32' with an angle equal to or greater than the critical angle is totally reflected by these surfaces. On the other hand, another part of the light which is incident on the bottom surface and the upper surface with an angle smaller than the critical angle is partially reflected, while the remaining part is refracted and output from the bottom surface or the upper surface. The light output from the bottom surface is reflected by the reflector 36 to again enter the light guide plate 32', while the light output from the upper surface advances toward the prism sheet 38'.

With such a setup, light propagating in the light guide plate 32' is gradually emitted toward the prism sheet 38' while repeatedly undergoing reflection and refraction. The light emitted from the prism sheet 38' has a directivity of a direction slightly deviated from a direction perpendicular to the upper surface. The direction of this directivity is a direction slightly deviated from 0° toward the plus side where a direction perpendicular to the upper surface corresponds to the polar angle of 0°, and a direction extending away from the light source 34 along the upper surface (from left to right in the drawing) corresponds to the polar angle of 90°.

Here, light "having a directivity" means that emitted light has a higher directivity in a certain specific direction. The level of the directivity, i.e., how high the directivity is in a certain direction, is represented by the half-value angle width (the polar angle width corresponding to the half-value width) in the intensity distribution of the emitted light. The direction indicated by the median value of the half-value angle width is defined as "the direction of the directivity".

To effectively utilize the light from the light source in the liquid crystal display device with microlenses, it is desired that collimated light of high directivity is emitted from the backlight toward the microlenses. However, a backlight which is conventionally used in a direct-viewing type liquid crystal display device cannot emit light of high directivity. Therefore, the utilization efficiency of light is not sufficient.

The above-described backlight 30' of the liquid crystal display device 100' can provide light of somewhat high directivity along the y-direction, while the directivity along the x-direction is low so that the light utilization efficiency is not sufficient.

The present invention was conceived in view of the above circumstances. One of the objects of the present invention is to improve the utilization efficiency of the backlight emission in a liquid crystal display device with microlenses. Another one of the objects is to improve the viewing angle characteristics of the liquid crystal display device with microlenses. Also, still another one of the objects of the present invention is to provide a backlight which is suitable to a liquid crystal display device with microlenses for the purpose of improving the light utilization efficiency or the viewing angle characteristics.

Means for Solving the Problems

A liquid crystal display device of the present invention is a liquid crystal display device including a plurality of pixels arranged in a matrix along a first direction and a second direction which are perpendicular to each other. The liquid crystal display device includes: a TFT substrate including a plurality of pixel electrodes arranged so as to correspond to the plurality of pixels; a counter substrate including a counter electrode which opposes to the pixel electrodes; a liquid crystal layer interposed between the TFT substrate and the counter substrate; a plurality of microlenses provided on a surface of the TFT substrate which is opposite to the liquid crystal layer so as to correspond to the plurality of pixels; and a backlight provided on a side of the plurality of microlenses which is opposite to the TFT substrate, wherein the plurality of microlenses includes a plurality of lenticular lenses extending in the first direction, the plurality of lenticular lenses being arranged side by side along the second direction, the backlight includes a light guide plate for guiding light emitted from a light source and a prism sheet placed over a first surface of the light guide plate which is closer to the microlenses, and the first surface of the light guide plate is provided with a prism array that includes a plurality of prisms extending in the second direction, the plurality of prisms being arranged side by side along the first direction.

In one embodiment, a ridge of each of the plurality of prisms of the prism array has a curved surface with a radius of curvature of not less than 10 μm and not more than 40 μm.

In one embodiment, a cross section of each of the plurality of prisms of the prism array which is taken along the first direction has a shape of an isosceles triangle with a vertex angle of not less than 90° and not more than 150°.

In one embodiment, the backlight includes a reflector plate for reflecting light from the light source toward the first surface of the light guide plate; and a second surface of the light guide plate which is closer to the reflector plate is provided with an optical element which includes a plurality of prisms extending in the first direction.

In one embodiment, the backlight is a reversed prism type backlight, and a surface of the prism sheet which is closer to the light guide plate is provided with a plurality of prisms extending in the first direction.

In one embodiment, each of the plurality of prisms of the prism sheet has a vertex angle of not less than 45° and not more than 70°.

In one embodiment, the backlight includes a plurality of LED light sources arranged along the first direction.

In one embodiment, in an azimuthal brightness distribution of light emitted from the backlight when viewed along the second direction, a brightness half-value angle width is 20° or less.

In one embodiment, the liquid crystal display device is a direct-viewing type liquid crystal display device.

In one embodiment, a surface of each of the plurality of microlenses which is closer to the backlight includes a flat portion which is generally parallel to a substrate surface and two curvature portions which are arranged such that the flat portion intervenes between the two curvature portions.

In one embodiment, the formula shown below holds:

$$2d \tan \theta_1 \leq P - a$$

where d is a thickness of the TFT substrate, P is an arrangement pitch of the pixels along the second direction, a is a width of an opening of the pixels along the second direction, and $\theta_1$ is a maximum propagation angle of light relative to a direction normal to the substrate surface after having been transmitted through the plurality of microlenses.

In one embodiment, the formula shown below holds:

$$0 < f \leq a$$

where f is a width of the flat portion along the second direction.

In one embodiment, the liquid crystal display device further includes a protection layer which is in contact with the flat portion.

In one embodiment, the formula shown below holds:

$$0 < b \leq a$$

where b is a width along the second direction of part of each of the plurality of microlenses which is in contact with the protection layer.

Effects of the Invention

In a liquid crystal display device or backlight of the present invention, a prism array constituted of a plurality of prisms is provided over the upper surface of the light guide plate of the backlight, the plurality of prisms extending in the arrangement direction of the microlenses (second direction) and being arranged side by side along the direction in which the microlenses are extending (first direction). Therefore, the directivity of the backlight emission in the front direction in the first direction can be improved, so that high display light with high front brightness can be provided.

The ridge of each of the plurality of prisms of the prism array has a curved surface whose radius of curvature is in an appropriate range. Therefore, the front brightness can be improved, while the viewing angle characteristic in terms of the first direction can be set to a desired excellent characteristic. The cross-sectional shape of the prism taken along the first direction may be an isosceles triangle whose vertex angle is in an appropriate range. In this case, the directivity is extremely high in the first direction, so that display of high front brightness can be provided.

Further, a prism sheet of an appropriate shape is provided over the prism array. Therefore, the front brightness of display light in the second direction is improved. Also, the directivity and viewing angle characteristics of the display light after having been transmitted through the microlenses can be desired characteristics.

Further, the surface of the microlens may include a flat portion and a curved surface such that the size of the flat portion and the size of the pixel opening are in an appropriate relationship, or such that the size of the contact portion of the microlens and the protection layer and the size of the pixel opening are in an appropriate relationship. In this case, the utilization efficiency of the backlight emission improves, so that display of high brightness can be provided.

Figure 1:
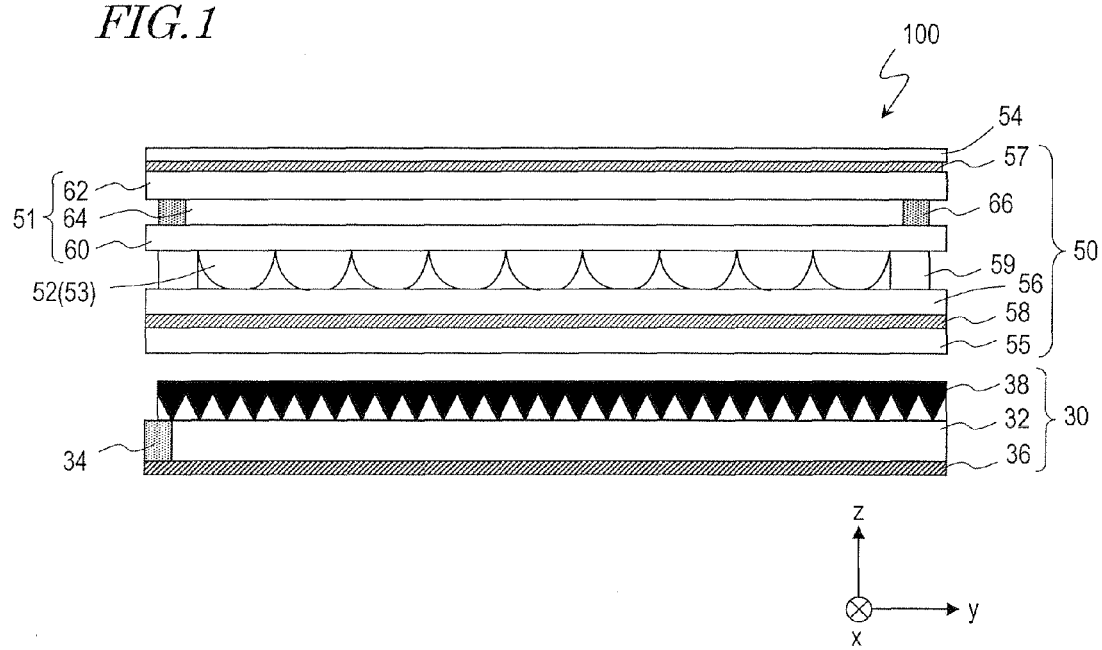
FIG. 1 A cross-sectional view schematically showing a structure of a liquid crystal display device 100 which is an embodiment of the present invention.

DESCRIPTION OF THE REFERENCE NUMERALS 30, 30' backlight
32, 32' light guide plate
34 light source
35 optical element
36 reflector
37 prism array
38, 38' prism sheet
50, 50' liquid crystal display panel
51 laminate substrate
52, 52' microlens array
53, 53' microlens
54 front-face side optical film
55 rear-face side optical film
56, 56' protection layer
57, 58 adhesion layer
59 support
60 TFT substrate
62 counter substrate
64 liquid crystal layer
65 light blocking portion
66 sealant
100, 100' liquid crystal display device

BEST MODE FOR CARRYING OUT THE INVENTION

Hereinafter, an embodiment of a liquid crystal display device of the present invention is described with reference to the drawings. Note that components which are the same as those of the above-described liquid crystal display device 100' are indicated by the same reference numerals, and the descriptions thereof are partially omitted.

FIG. 1 is a cross-sectional view schematically showing a structure of a liquid crystal display device 100 of the present embodiment. The liquid crystal display device 100 is a direct-viewing type liquid crystal display (LCD) of an active matrix type. As shown in the drawing, the liquid crystal display device 100 includes a liquid crystal display panel (a liquid crystal display panel with microlenses) 50 and a backlight 30 placed under the liquid crystal display panel 50 (on the surface opposite to the display surface).

The liquid crystal display panel 50 includes a laminate substrate 51 including a plurality of pixels which are arranged in a matrix along a first direction (x direction) and a second direction (y direction) that are perpendicular to each other, a microlens array 52 including a plurality of microlenses 53 provided over a light receiving surface of the laminate substrate 51 (the bottom surface of the laminate substrate 51 which extends parallel to the x-y plane), a support 59 provided in a perimeter region of the microlens array 52, a front-face side optical film 54 provided on the viewer side of the laminate substrate 51 (upper side of the drawing), a rear-face side optical film 55 which is provided on the light-incident side of the microlens array 52, and a protection layer 56 interposed between the rear-face side optical film 55 and the microlens array 52.

The microlens array 52 is made of a photocurable resin. The microlenses 53 of the microlens array 52 are each formed by irradiating the photocurable resin via an opening of the pixel in accordance with the method described in Patent Document 5, for example, in a self-aligning fashion such that the microlenses 53 correspond to the respective pixels.

The protection layer 56 is made of the same photocurable resin as the microlens array 52 and is provided so as to be in contact with the microlens array 52 and the support 59. There are gaps containing air between the microlens array 52 and the protection layer 56.

The front-face side optical film 54 is bonded to the laminate substrate 51 via an adhesion layer 57. The rear-face side optical film 55 is bonded to the protection layer 56 via an adhesion layer 58. The protection layer 56 is made of a UV-curable acrylic or epoxy resin which has high visible-light transmittance, but may alternatively be made of a thermosetting resin. The protection layer 56 and the support 59 are preferably made of the same material as the microlenses 53 or a material which has substantially the same refractive index as that of the material of the microlenses 53.

Since the protection layer 56 is fixed so as to be in contact with the support 59 and the plurality of microlenses 53, the liquid crystal display panel 50 has an increased strength to withstand a depressing force. Also, when a curable resin is used for the protection layer 56, the protection layer 56 and the microlens array 52 can be tightly bound without using an adhesive. Thus, according to the present embodiment, even when the liquid crystal display panel 50 is subjected to a depressing force, the distance between the rear-face side optical film 55 and the microlens array 52 is maintained constant, whereby occurrence of brightness unevenness due to a change of the distance between these elements can be prevented.

The laminate substrate 51 includes a TFT substrate 60 that has pixel electrodes and TFTs which are arranged so as to correspond to respective ones of the plurality of pixels, a counter substrate 62 that is a color filter substrate (CF substrate) which has a common electrode opposite to the pixel electrodes, and a liquid crystal layer 64. The liquid crystal layer 64 includes a liquid crystal material encapsulated between the TFT substrate 60 and the counter substrate 62 and is tightly sealed by a sealant 66 provided at the perimeter.

Each of the microlenses 53 is a lenticular lens extending in the column direction of the pixels arranged in a matrix over the laminate substrate 51 (x-direction, first direction) so as to extend over the plurality of pixels. The microlens array 52 is constituted of a plurality of lenticular lenses of this form which are arranged side by side along the row direction of the pixels (y-direction, second direction). The pixel pitch (the width of one pixel along the y-direction) is about 170 μm. The width of the microlens 53 along the y-direction is equal to the pixel pitch.

Figure 2:
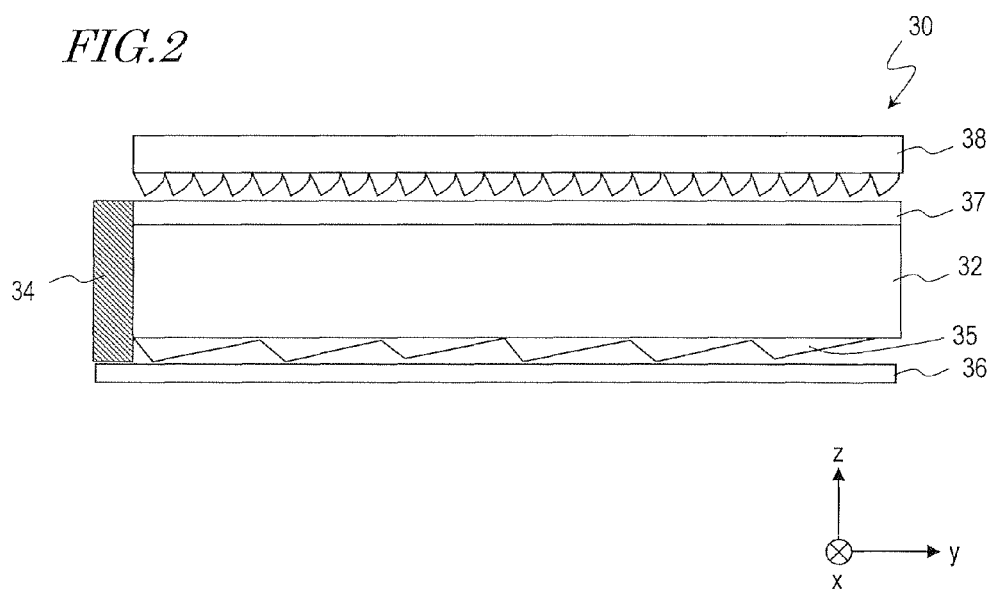
FIG. 2 A cross-sectional view schematically showing a structure of a backlight 30 of the liquid crystal display device 100.

FIG. 2 is a cross-sectional view showing details of the structure of the backlight 30. The backlight 30 is a turning lens (TL) or reversed prism (RP) type backlight.

As shown in FIG. 1 and FIG. 2, the backlight 30 includes a light source 34 such as an LED, a light guide plate 32 for guiding light emitted from the light source 34, a prism sheet 38 placed over the upper surface (first surface) of the light guide plate 32 which is on the microlens side, and a reflector 36 placed under the light guide plate 32 for reflecting light emitted from the light source 34 toward the upper surface of the light guide plate 32. The light source 34 may be constituted of a plurality of LED light sources which are arranged side by side along the x-direction over one side surface of the light guide plate 32.

A surface of the prism sheet 38 which is closer to the light guide plate 32 is provided with a plurality of prisms extending in the x-direction. The vertex angle of each of the plurality of prisms of the prism sheet 38 (the angle of a vertex which is closer to the light guide plate 32) is not less than 45° and not more than 70°. With such a prism sheet provided, the light that outgoes toward the liquid crystal display panel 50 is collimated light of high directivity when viewed in a cross section taken along the y-direction.

Figure 3:
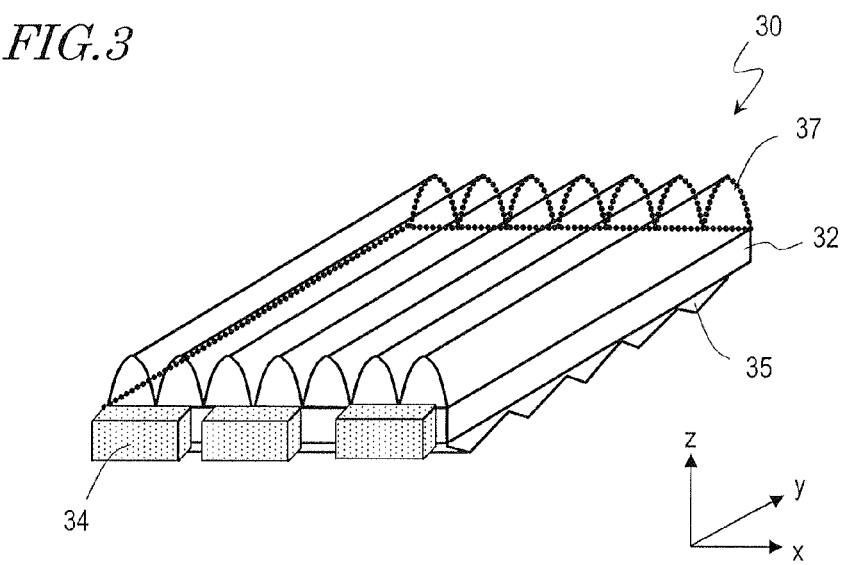
FIG. 3 A perspective view schematically showing a structure of a light guide plate 32 of the backlight 30.

FIG. 3 is a perspective view showing details of the structure of the light guide plate 32. As shown in FIG. 3, the lower surface of the light guide plate 32 is provided with saw-tooth grooves extending in the x-direction such that the lower surface is formed by a plurality of slope surfaces with different slope angles. Here, the plurality of slope surfaces are shaped such that a slope surface which is more distant from the light source 34 has a greater slope angle. In this way, the lower surface of the light guide plate 32 is provided with an optical element 35 that is constituted of a plurality of prisms extending in the x-direction which have slope surfaces with different angles.

Light emitted from the light source 34 is reflected by the reflector 36 or the optical element 35 of the light guide plate 32 and transmitted through the upper surface (emission surface) of the light guide plate 32. Then, it is refracted by the prisms of the prism sheet 38 to outgo toward the liquid crystal display panel 50. Part of the light emitted from the light source 34 which is incident on the bottom surface and the upper surface of the light guide plate 32 with an angle equal to or greater than the critical angle is totally reflected by these surfaces. On the other hand, another part of the light which is incident on the bottom surface and the upper surface with an angle smaller than the critical angle is partially reflected, while the remaining part is refracted and output from the bottom surface or the upper surface. The light output from the bottom surface is reflected by the reflector 36 to again enter the light guide plate 32, while the light output from the upper surface advances toward the prism sheet 38.

With such a setup, light propagating in the light guide plate 32 is gradually emitted toward the prism sheet 38 while repeatedly undergoing reflection and refraction. Here, the light emitted from the light guide plate 32 has a directivity of a direction slightly deviated from a direction perpendicular to the upper surface when viewed in a cross section taken along the y-direction.

The upper surface of the light guide plate 32 is provided with a prism array 37 which is constituted of a plurality of prisms extending in the y-direction, the prisms being arranged side by side in the x-direction.

Figure 4:
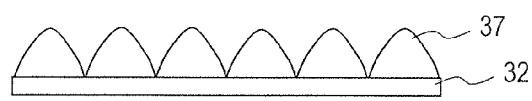
FIG. 4 A diagram showing a cross-sectional shape of a prism array provided on the light guide plate 32.

FIG. 4 shows the shape of a cross section of the prism array 37 which is taken along the x-direction. As shown in the drawing, the ridge of each of the plurality of prisms of the prism array 37 (a vertex portion closer to the prism sheet 38) is not acutely tapered, but the ridge surface is a curved surface. The radius of curvature of this curved surface is not less than 10 μm and not more than 40 μm. Using the prism array 37 of such a shape can improve the directivity of the emitted light when viewed in a cross section taken along the x-direction and enables the backlight to emit light which is more approximate to collimated light than light that would be emitted when the prism array 37 is not used.

Figure 5:
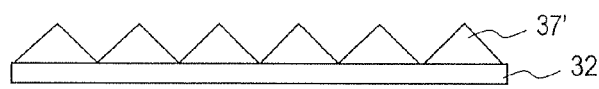
FIG. 5 A diagram showing a cross-sectional shape of another embodiment of the prism array provided on the light guide plate 32.

FIG. 5 shows the shape of a cross section of another embodiment of the prism array 37 (prism array 37') which is taken along the x-direction. As shown in the drawing, the cross-sectional shape of each of the plurality of prisms of the prism array 37' is an isosceles triangle with the vertex angle of about 130° at its ridge. The vertex angle is preferably not less than 90° and not more than 150°. Using the prism array 37' of such a shape can improve the directivity of the emitted light when viewed in a cross section taken along the x-direction and enables the backlight to emit light which is more approximate to collimated light than light that would be emitted when the prism array 37' is not used.

Figure 6:
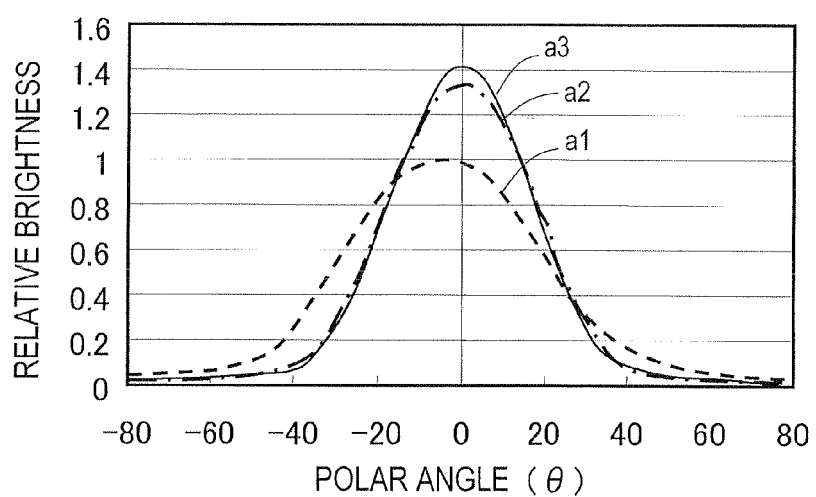
FIG. 6 A graph which illustrates the viewing angle characteristic along the x-direction of light emitted from the backlight 30.

FIG. 6 shows the viewing angle characteristic (the dependence of the brightness on the polar angle) of the emitted light from the backlight 30 when viewed in a cross section taken along the x-direction. In the graph, a1 represents the viewing angle characteristic of emitted light from a backlight in which the prism array 37 is not provided on the upper surface of the light guide plate 32 (but the other components are the same as those of the backlight 30); a2 represents the viewing angle characteristic of emitted light from the backlight 30 in which the ridge of each prism of the prism array 37 has a curved surface with the radius of curvature of 40 μm; and a3 represents the viewing angle characteristic of emitted light from the backlight 30 in which the ridge of each prism has a curved surface with the radius of curvature of 13 μm.

As seen from FIG. 6, the backlight 30 that includes the prism array 37 provides light which has a narrower brightness half-value angle width, i.e., a higher directivity, and which is hence more approximate to collimated light than a backlight which does not includes the prism array 37. The backlight 30 that includes the prism array 37 with the radius of curvature of 13 μm emits light of high directivity which has a slightly narrower brightness half-value angle width than in the case where the radius of curvature is 40 μm. The direction of the directivity is identical with the direction of polar angle 0° (front direction) in any of the above cases. It is understood from this that using the prism array 37 in which the ridge of the prism has a curved surface with the radius of curvature of 10 to 40 μm can increase the front brightness of the emitted light (the brightness of the emitted light when viewed in front of the backlight).

Figure 7:
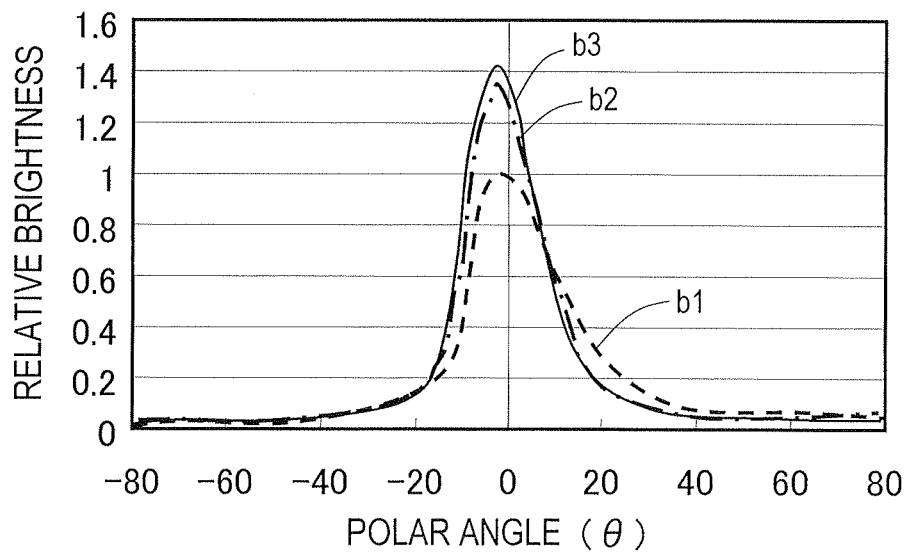
FIG. 7 A graph which illustrates the viewing angle characteristic along the y-direction of light emitted from the backlight 30.

FIG. 7 shows the viewing angle characteristic of emitted light from the backlight 30 (the polar angle dependence of the brightness) when viewed in a cross section taken along the y-direction. In the graph, b1 represents the viewing angle characteristic of emitted light from a backlight in which the prism array 37 is not provided on the upper surface of the light guide plate 32 (but the other components are the same as those of the backlight 30); b2 represents the viewing angle characteristic of emitted light from the backlight 30 in which the ridge of each prism of the prism array 37 has a curved surface with the radius of curvature of 40 μm; and b3 represents the viewing angle characteristic of emitted light from the backlight 30 in which the ridge of each prism has a curved surface with the radius of curvature of 13 μm.

As seen from FIG. 7, the backlight 30 that includes the prism array 37 provides light which has a narrower brightness half-value angle width, i.e., a higher directivity, and which is hence more approximate to collimated light than a backlight which does not include the prism array 37. The backlight 30 that includes the prism array 37 with the radius of curvature of 13 μm emits light of high directivity which has a slightly narrower brightness half-value angle width than in the case where the radius of curvature is 40 μm. The direction of the directivity is slightly deviated from the front direction to a direction which is away from the light source 34 but is substantially identical with the direction of polar angle 0° (front direction) in any of the above cases. It is understood from this that using the prism array 37 in which the ridge of the prism has a curved surface with the radius of curvature of 10 to 40 μm can increase the front brightness in the liquid crystal display device.

As seen from the comparison between FIG. 6 and FIG. 7, the directivity of the emitted light is higher when viewed along the y-direction than when viewed along the x-direction. When the emitted light enters the microlens array 52, the microlenses 53 that are lenticular lenses extending in the x-direction function as light collection lenses in terms of the y-direction. Therefore, the directivity of light transmitted through the microlenses 53 appropriately decreases. Thus, the viewing angle characteristic in terms of the y-direction of the emitted light (display light) of the liquid crystal display device 100 can be modified to an appropriate characteristic depending on its use.

When viewed along the x-direction, the microlenses do not substantially function as the light collection lens. Therefore, the directivity of the emitted light from the backlight 30 is substantially equal to the directivity of the display light of the liquid crystal display device 100. Thus, to provide display light with an appropriate viewing angle characteristic, it may not be preferred in some cases that the directivity of emitted light from the backlight 30 is excessively high.

According to the liquid crystal display device 100 of the present invention, the upper surface of the light guide plate 32 of the backlight 30 is provided with the prism array 37 which is constituted of a plurality of prisms that extend in the y-direction and that are arranged side-by-side along the x-direction. Therefore, the front brightness of the display light can be improved, and display of high quality can be provided. Also, the ridge of each prism of the prism array 37 has a curved surface with an appropriate radius of curvature. Therefore, the front brightness can be improved while the viewing angle characteristic in terms of the x-direction is appropriately maintained.

Next, the components provided around the microlens array 52 are described with reference to FIGS. 8 to 10.

Figure 8:
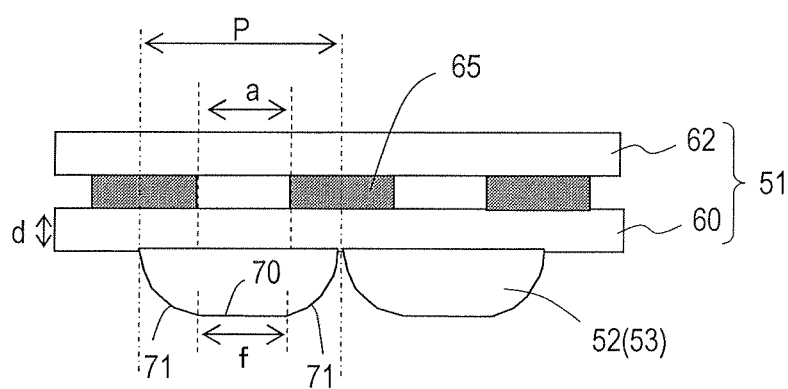
FIG. 8 A cross-sectional view schematically showing the structure of microlenses 53 and laminate substrate 51 in the liquid crystal display device 100.
Figure 9:
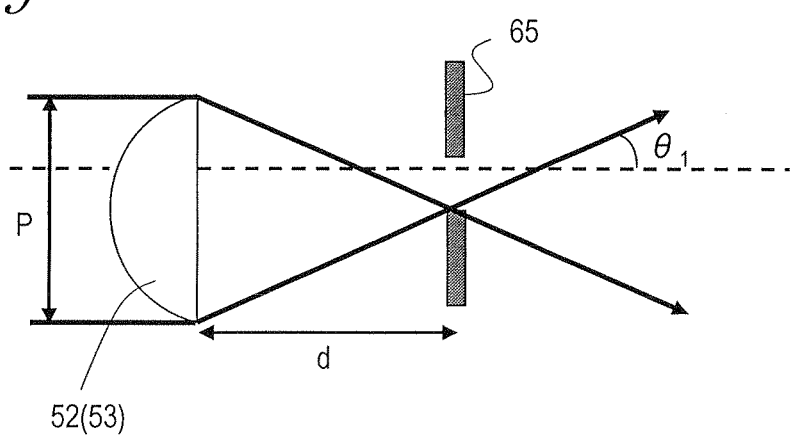
FIG. 9 A cross-sectional view schematically showing the relationship between the microlens 53 and a light blocking portion 65 of a pixel in the liquid crystal display device 100.

FIG. 8 and FIG. 9 are cross-sectional views showing the relationship between the microlenses 53 and the laminate substrate 51. As shown in FIG. 8, a surface of each of the microlenses 53 which is closer to the backlight 30 includes a flat portion 70 that is generally parallel to the substrate surface (x-y plane) and two curvature portions (curved surface portions) 71 that are arranged such that the flat portion 70 intervenes between the two curvature portions 71.

The inequality shown below holds:

$$2d \tan \theta_1 \leq P - a$$

where d is the thickness of the TFT substrate 60, P is the arrangement pitch of the pixels along the y-direction (corresponding to the width of the microlens 53), a is the width of the opening of a pixel along the y-direction, and $\theta_1$ is a maximum propagation angle of light transmitted through the microlens 53 relative to the direction normal to the substrate surface (see FIG. 9).

Also, the inequality shown below holds:

$$0 < f \leq a$$

where f is the width of the flat portion 70 along the y-direction (see FIG. 8).

Since the above relationships are satisfied, light impinging on the flat portion 70 of the microlens 53 is transmitted through the microlens 53 without being substantially refracted. Light which would have been blocked by a light blocking portion 65 around the pixel opening (including wire portions, black matrix portions, etc.) if there were not the microlenses 53 is refracted by the curvature portions 71 and transmitted through the opening before outgoing as display light. Therefore, employing the microlenses 53 and the laminate substrate 51 which are designed as described above realizes display of high quality with high backlight emission utilization efficiency.

Figure 10:
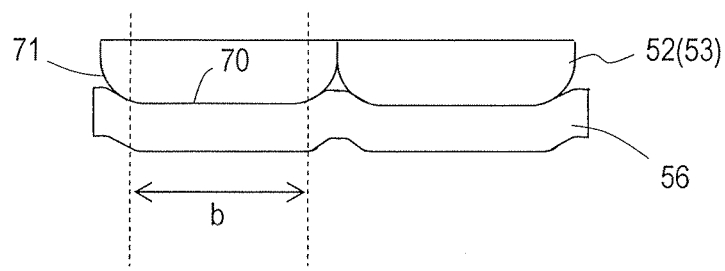
FIG. 10 A cross-sectional view schematically showing the structure of the microlens 53 and a protection layer 56 in the liquid crystal display device 100.
Figure 11:
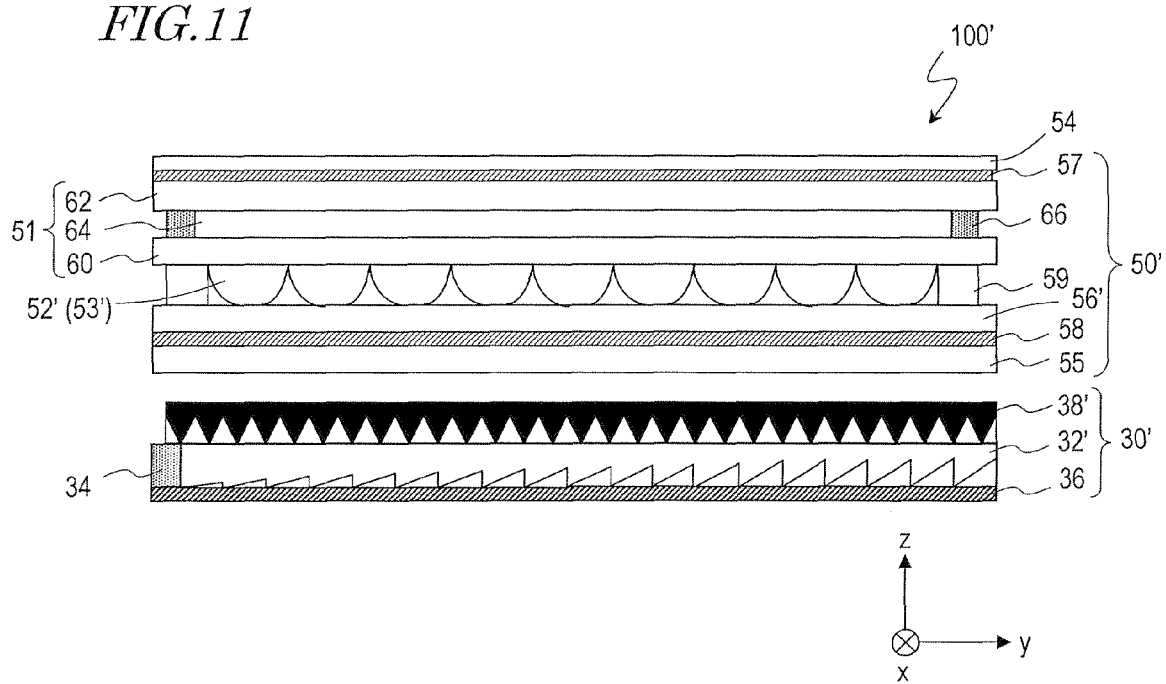
FIG. 11 A cross-sectional view showing an example of a liquid crystal display device which includes a microlens array and a backlight.

FIG. 10 is a cross-sectional view showing the relationship between the microlenses 53 and the protection layer 56. As shown in FIG. 10, the protection layer 56 is formed so as to be in contact with the entire surface of the flat portions 70 of the microlenses 53. The protection layer 56 may be in contact with part of the curvature portion 71. The inequality shown below holds:

$$0 < b \leq a$$

b is the width along the y-direction of part of the microlens 53 which is in contact with the protection layer 56.

In a region in which the protection layer 56 and the microlenses 53 are in contact with each other, there is a portion which fails to contribute to a light-collecting effect of the lens. However, since the width of that area is not more than the width of the opening, light which is transmitted therethrough is not blocked by the light blocking portion 65. Therefore, a liquid crystal display device with high backlight emission utilization efficiency can be provided.

INDUSTRIAL APPLICABILITY

The present invention is suitably used in liquid crystal display devices of which high brightness and high viewing angle characteristics are demanded, such as display devices for TV (television) and PC (personal computer) applications, displays for mobile terminals, displays for onboard devices, etc.

The invention claimed is:

1. A liquid crystal display device including a plurality of pixels arranged in a matrix along a first direction and a second direction which are perpendicular to each other, comprising:
    a TFT substrate including a plurality of pixel electrodes arranged so as to correspond to the plurality of pixels;
    a counter substrate including a counter electrode which opposes to the pixel electrodes;
    a liquid crystal layer interposed between the TFT substrate and the counter substrate;
    a plurality of microlenses provided on a surface of the TFT substrate which is opposite to the liquid crystal layer so as to correspond to the plurality of pixels; and
    a backlight provided on a side of the plurality of microlenses which is opposite to the TFT substrate, wherein the plurality of microlenses includes a plurality of lenticular lenses extending in the first direction, the plurality of lenticular lenses being arranged side by side along the second direction, the backlight includes a light guide plate for guiding light emitted from a light source and a prism sheet placed over a first surface of the light guide plate which is closer to the microlenses, the first surface of the light guide plate is provided with a prism array that includes a plurality of prisms extending in the second direction, the plurality of prisms being arranged side by side along the first direction;

wherein a surface of each of the plurality of microlenses which is closer to the backlight includes a flat portion which is generally parallel to a substrate surface and two curvature portions which are arranged such that the flat portion intervenes between the two curvature portions; and wherein the formula shown below holds: $2d \tan \theta_1 \leq P-a$, where d is a thickness of the TFT substrate, P is an arrangement pitch of the pixels along the second direction, a is a width of an opening of the pixels along the second direction, and $\theta_1$ is a maximum propagation angle of light relative to a direction normal to the substrate surface after having been transmitted through the plurality of microlenses.

2. The liquid crystal display device of claim 1, wherein the formula shown below holds:

$$0 < f \leq a$$

where f is a width of the flat portion along the second direction.

3. The liquid crystal display device of claim 1, further comprising a protection layer which is in contact with the flat portion.

4. The liquid crystal display device of claim 3, wherein the formula shown below holds:

$$0 < b \leq a$$

where b is a width along the second direction of part of each of the plurality of microlenses which is in contact with the protection layer.

* * * * *